United States Patent [19]

Terrien et al.

[11] Patent Number: 4,693,818
[45] Date of Patent: Sep. 15, 1987

[54] ION EXCHANGE APPARATUS

[75] Inventors: Conrad Terrien, Elmhurst; Lee G. Carlson, Willow Springs, both of Ill.

[73] Assignee: UIP Engineered Products Corporation, Addison, Ill.

[21] Appl. No.: 663,184

[22] Filed: Oct. 22, 1984

[51] Int. Cl.$^4$ ............................................. B01J 47/10
[52] U.S. Cl. .................................................. 210/189
[58] Field of Search ................ 210/676, 189, 268, 269

[56] References Cited

U.S. PATENT DOCUMENTS

| | | | |
|---|---|---|---|
| 3,492,092 | 1/1970 | Higgins | 210/189 |
| 3,775,310 | 11/1973 | Conway et al. | 210/676 |
| 3,972,810 | 8/1976 | Chopra | 210/676 |
| 4,228,001 | 10/1980 | Carlson | 210/189 |

Primary Examiner—Ivars Cintins
Attorney, Agent, or Firm—Ronald E. Barry

[57] ABSTRACT

A moving bed ion exchange apparatus including a loading vessel having a resin inlet and a resin outlet and containing an ion exchange resin bed, a feed liquid inlet and outlet for passing a feed liquid through the resin bed in the loading vessel, a U-shaped regeneration vessel containing an ion exchange resin bed, one end of the regeneration vessel having a first conduit in resin transfer communication with the resin outlet in the loading vessel and the other end of the regeneration vessel having a second conduit in resin transfer communication with the resin inlet of the loading vessel, a first resin passing control valve for controlling the flow of resin through the first conduit, a second resin passing control valve for controlling the flow of resin through the second conduit, a regenerant inlet connected to the regeneration vessel for introducing regenerant into said vessel, a displacement rinse inlet connected to the regeneration vessel for introducing a rinse liquid into said regeneration vessel to diplace the regenerant, and a polish rinse inlet connected to the second conduit in close proximity to the second control valve for passing a rinse liquid through the second conduit for moving the resin away from the second control valve prior to admission of the resin into the loading vessel.

15 Claims, 14 Drawing Figures

ION EXCHANGE APPARATUS

BACKGROUND OF THE INVENTION

Ion exchange softeners and deionizers of the fixed bed type have been used for many years in industrial and commercial applications. The development of "moving bed" or continuous ion exchange systems has resulted in significant efficiencies in industry. In this type of a system, the major functions, loading on the one hand and regenerating, backwashing and rinsing on the other, were separated into different vessels and the resin moved from one vessel to the other and back. However, these systems require high-pulse pressure in order to move the resin beds and, as a consequence, high pressure vessels which meet ASME codes had to be used with the system, thus, may limit their application. Typical moving bed systems of this type are shown in the Higgins U.S. Pat. No. 3,677,937 issued July 18, 1972; U.S. Pat. No. 3,580,842 issued May 25, 1971; U.S. Pat. No. 3,984,313 issued Oct. 5, 1976; U.S. Pat. No. 3,579,322 issued May 18, 1971; U.S. Pat. No. 3,492,092 issued Jan. 27, 1970; and U.S. Pat. No. 2,815,322 issued Dec. 3, 1957. The major drawback of the Higgins loop was the requirement to move the entire resin inventory, often tons of resin, in a single pulse movement even though only about one-sixth of the resin volume was transferred from one vessel to the other. The high pressure required to move the resin also caused turbulence, particularly in the larger apparatus, in the resin bed, thereby upsetting the laminar resin/liquid flow which should flow in a laminar relation for maximum efficiency. Four large butterfly valves had to be used between the vessels in order to allow for the movement of these massive amounts of resin.

Some of these problems were overcome by the earlier U.S. Pat. Nos. 4,228,001 to Carlson and 4,208,904 wherein a low pressure system was disclosed in which the resin inventory is moved in several phases. This was accomplished at low pressure by moving a small amount of resin from the loading vessel to one of the support vessels and then moving a corresponding amount of clean resin into the bottom of the loading vessel from another support vessel. This eliminated the requirement for high pressure vessels, thus, reducing costs considerably. The large butterfly valves also were eliminated since only a small volume of resin was moved at one time and the interfaces in the regeneration column were not disturbed by the gentle movements of the resin. The system could be shut down for long periods of time, since the only resin flow required was at the top of the loading vessel and at the bottom of the regeneration column, either as a single movement, or as two separate movements. However, this apparatus required three support vessels to make up the regeneration section which are costly to make and had to be linked together to allow for resin transfer.

SUMMARY OF THE INVENTION

The ion exchange apparatus of the present invention requires only two low pressure vessels: a loading vessel and a regeneration vessel. The resin is transferred from the loading vessel by a unique method which allows for the transfer function to occur during the actual run or loading time of the loading vessel. This can be accomplished by opening the valve between the loading vessel and the regeneration vessel to allow the resin to spurt from the loading vessel to the regeneration vessel at one time or by intermittently opening the valve to transfer the resin. This latter technique has the extra benefit of backwashing of the fines and crud out of the regeneration vessel and layering of the resin in the top of the regeneration vessel to create a number of stage heights which improve the overall efficiency of the regeneration section. The resin is transferred out of the loading vessel during the operating cycle of the loading vessel. The resin is transferred from the regeneration vessel to the loading vessel during shut down of the operating cycle generally in a matter of seconds. All other movements of the resin in the regeneration column occur while the loading vessel is in the operating cycle. This system only requires two resin control valves to control the transfer of resin in contrast to the Higgins apparatus and others which require more than two valves, and yet isolates all functions of loading, regeneration, and all rinsing steps.

IN THE DRAWINGS

DESCRIPTION OF THE INVENTION

Figure 1:
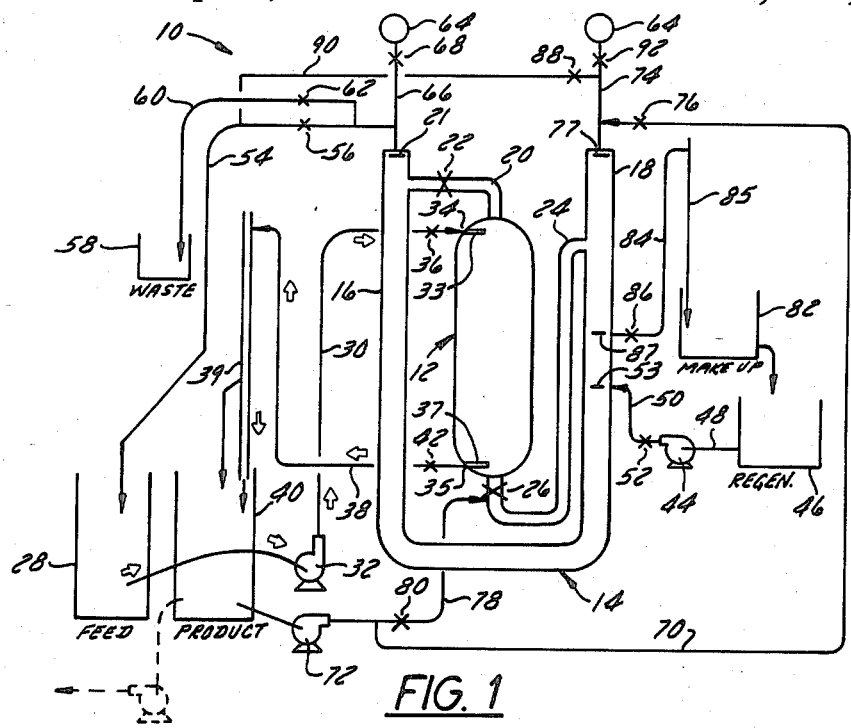
FIG. 1 is a schematic view of the ion exchange apparatus shown in the start-up condition.

The low pressure ion exchange apparatus 10 basically includes a loading vessel 12 and a regeneration vessel 14 having vertically extending legs 16 and 18 arranged generally in the form of a "U." The loading vessel 12 contains a "compact" resin bed 13 and the regeneration vessel 14 contains a "packed" resin bed 15. This distinction in the condition of the resin beds 13 and 15 refers to the percentage volume of resin to liquid. In the "compact" resin bed this ratio should be in the order of 60% resin - 40% liquid. In the "packed" resin bed 15 the ratio is in the order of 45% resin - 55% liquid.

The upper end of the vessel 12 is connected to the upper end of the leg 16 by means of a first resin transfer conduit 20. Flow through the conduit 20 is controlled by means of a first resin control valve 22 generally in the form of a ball, diaphragm-weir or pindh valve. The bottom of the loading vessel 12 is connected to the upper portion of the leg 18 by means of a resin injection column 24. Flow through the injection column 24 to the loading vessel is controlled by means of a second resin control valve 26. Feed liquid from a reservoir 28 is pumped to a fluid inlet 34 near the top of the loading vessel 12 by means of a first feed pump 32 through a feed conduit 30 which is connected to a diffuser assembly 33 in the upper portion of the loading vessel 12. Flow through conduit 30 can be maintained constant by means of a pressure or rate flow control valve 36. Product fluid is discharged from the bottom of the loading vessel 12 by means of a collector assembly 37 connected to a discharge outlet 35 near the bottom of the loading vessel. The outlet 35 is connected to a discharge conduit 38 which is connected to a riser 39 in the form of a jack leg to prevent syphoning of the liquid from product reservoir 40. Conduit 38 can be closed during regenerated resin transfer by means of a discharge liquid shut off valve 42.

The resin bed 15 in the regeneration vessel 14 is shifted to fill leg 18 by admitting pressurized air or liquid to the upper end of leg 16. This can be accomplished by connecting a pressurized air source 64 to the regeneration vessel through a pressure line 66 which is controlled by means of an air valve 68. Alternately waste liquor or other liquid could be pumped through line 66 into the regeneration vessel. After the resin has been shifted, the upper end of leg 16 is refilled with spent resin from the loading vessel 12 as described hereinafter.

Regenerant liquid is then pumped into the leg 18 of the regeneration vessel 14 by means of a pump 44 connected to a regenerant reservoir 46 by line 48 and the regeneration vessel 14 through a line 50. Fluid flow through the line 50 may be controlled by means of a control valve 52. The introduction of regenerant liquid into the regeneration vessel 14 will displace liquid in the upper end of the leg 16 of the regeneration vessel 14 to flow back to the feed reservoir 28 through a conduit 54 which is controlled by means of a fluid control valve 56. The initial liquid discharged is essentially feed liquor used to carry resin from the loading vessel 12 to the regeneration vessel 14. The amount of liquid discharged is equivalent to the amount of regenerant liquid required to fill the resin void volume of one pulse section of the regeneration vessel approximately 55% as described above.

Valve 56 is closed and a displacement rinse liquid in the form of deionized or product liquid is pumped from either the product reservoir 40 or other reservoir through conduit 70 into the inlet 74 at the upper end of the leg 18 to displace the regenerant liquid one pulse section down in the regenerant vessel 14. This is accomplished by means of a pump 72 connected to the conduit 70 which is controlled by means of a control valve 76. Liquid in the top of the leg 16 is discharged to a waste reservoir 58 through a conduit 60 which is controlled by means of a fluid control valve 62.

After the regenerant liquid has been displaced one pulse section, valve 62 is closed and a recovery rinse liquid is introduced to recover a portion of the regenerant liquid in the regeneration vessel to be used for make-up fluid for this regenerant liquid. This is accomplished by continuing the introduction of rinse liquid into leg 18 and opening a valve 86 to discharge liquid through a conduit 84 and a jack leg 85 into a make-up reservoir 84.

The injection column 24 is polished or rinsed with a product liquid by means of the pump 72 through a conduit 78 controlled by a valve 80. The polish or rinse liquid is discharged from conduit 24 through the upper pulse section of leg 18 of the regeneration vessel and conduits 74, 90 and 54 to the feed reservoir 28 via valve 88.

REGENERATION CYCLE

Figure 2C:
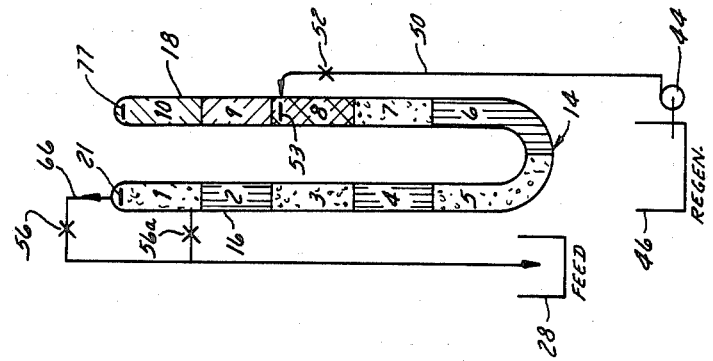
FIG. 2C shows the regenerant being added to the regeneration vessel.
Figure 2B:
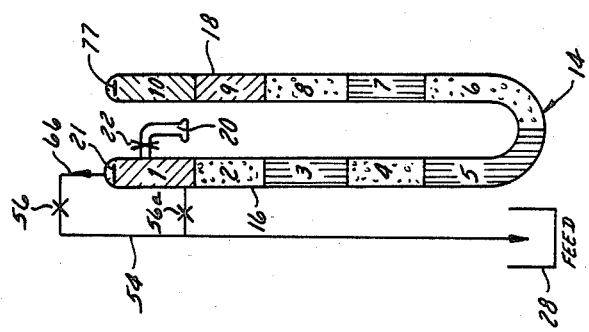
FIG. 2B shows the regeneration vessel after resin transfer.
Figure 2A:
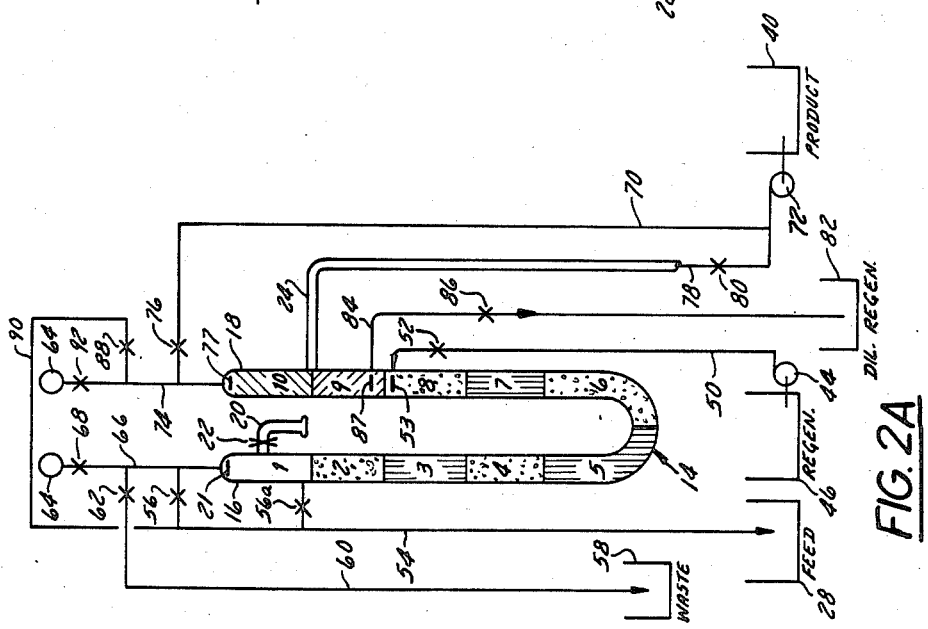
FIG. 2A is a view of the U-shaped regeneration vessel shown on stream ready for resin transfer from the loading vessel to the top of one of the legs of the U-shaped regeneration vessel.

Referring to FIGS. 2A through 2H the stages of the regenerating cycle in the regeneration and the several subrinsing steps of the resin bed in the regeneration vessel 14 are shown in sequence. As seen in FIG. 2A, the regeneration vessel 14 is shown having a number, for example, ten layered pulse sections (1–10), each pulse section having an equal volume and representing the volume of resin transferred to or from the loading vessel 12. Each pulse section of resin is thus shifted from the upper end of leg 16 to the upper end of leg 18 in a number of steps. It should be noted that the direction of movement of the rinse liquid is counter to the direction of resin flow and is generally considered to be in a counter-current mode.

As seen in the drawing, the resin is shifted in ten steps, however, the number of steps can be varied depending on the degree of stripping contemplated for the resin before return to the loading vessel. In order to approach maximum or 100% capacity for the resin on return, this example suggests 10 steps to be necessary as shown in the drawings.

ON STREAM WAITING FOR RESIN TRANSFER

FIG. 2A shows the relative positions of the valves for controlling the flow of liquid/air to and from the U-shaped vessel 14. The vessel is in the ready mode, waiting for the transfer of a metered volume of resin from the loading vessel 12 to the void section 1 in the upper end of leg 16 in the regeneration vessel 14. At this stage the resin in the regeneration vessel has been subjected to all of the functions, such as regeneration, various rinses, and resin shift of the regeneration cycle.

SPENT RESIN TRANSFER

In FIG. 2B the spent or exhausted resin has been transferred from the loading vessel 12 thru conduit 20 and valve 22 into the top of pulse section 1 of leg 16 of vessel 14. This transfer occurs during the operating cycle of the loading vessel with a minor amount of feed liquid being used to make the transfer and the major amount passing through the compact resin bed 13. Excess feed liquid that is used to transfer the spent resin to the regeneration vessel 14 is discharged thru a resin strainer 21 at the top of vessel 14 into conduit 66, through valve 56 and into the conduit 54 for discharge into the feed tank 28 where it will be recycled. The resin can be transferred by a series of short pulses of several seconds duration or a single pulse. In the event the flow rate of the resin slurry flow creates turbulence in the leg 16 of the regeneration vessel 14, a throttle valve can be provided in conduit 54 or the fluid can be discharged to conduit 54 through a valve 56a located at the bottom of pulse section 1. Intermittant actuation of the valve 22 to transfer for example one-third of the resin at a time will also aid in reducing turbulence as well as remove resin fines and crud that may accummulate in the resin bed.

REGENERANT ADDITION

In the next step, FIG. 2C, a metered amount of regenerant is admitted into the regeneration vessel 14 at the interface of pulse sections 8 and 9 in the regeneration vessel. The concentration and volume of regenerant depending upon the type of ion exchange operation being conducted by the apparatus. Generally, the volume is equivalent to the packed resin void volume of one pulse section of the vessel 14, approximately 55%. The concentration of the regenerant may vary for different applications. The preferred and practical practice would be to use a multiple of the resin void volume of one pulse section. The regenerant liquid is pumped from tank 46 by means of pump 44 through conduit 50 and valve 52 into leg 18 of vessel 14 thru a distributor 53 contained in leg 18 as shown. The regenerant liquid displaces the liquid below the distributor 53 in a uniform laminar mode and forces the liquid in the vessel 14 out thru the resin strainer/diffuser 21 located at the top of leg 16 thru conduits 66 and 54 and valve 56 to the feed tank 28, for recycling. The discharged liquid at this stage is essentially feed liquid transferred therein during the transfer of resin from the loading vessel 12 into the regeneration vessel 14 step. At the end of this step the liquid in pulse section 1 at the top of leg 16 is then a concentrated waste solution.

DISPLACEMENT RINSE

Figure 2F:
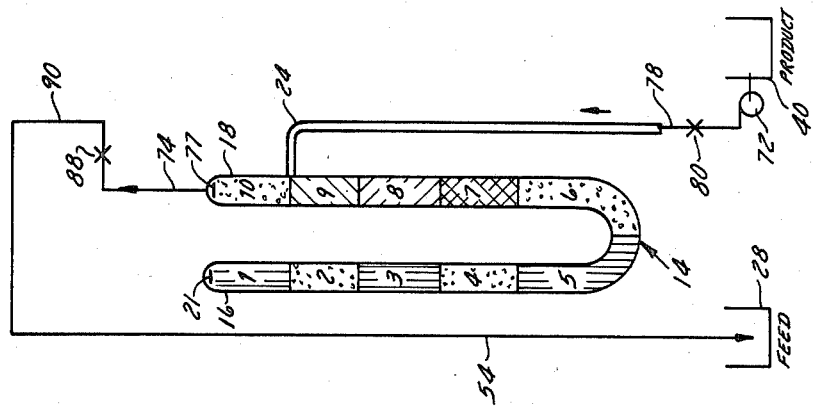
FIG. 2F shows the counter current upflow of the polish rinse through the resin in the injection column and the upper end of one of the legs of the regeneration vessel.
Figure 2E:
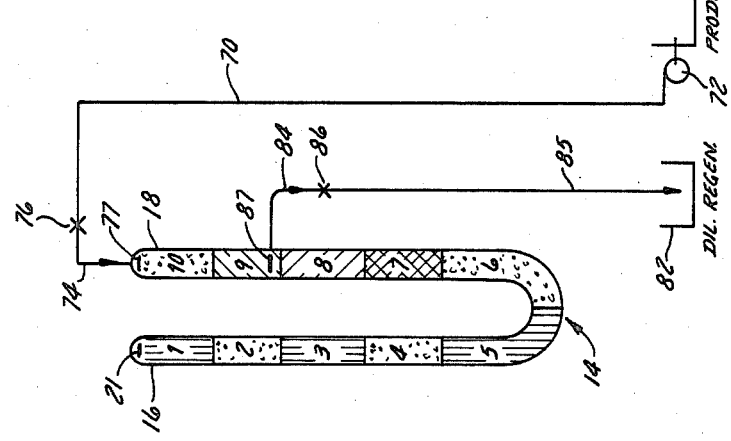
FIG. 2E shows the recovery of dilute regenerant from the regeneration vessel.
Figure 2D:
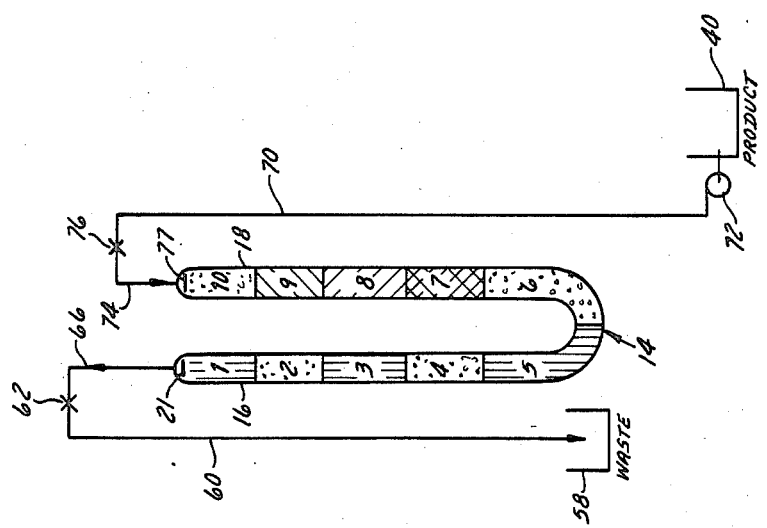
FIG. 2D shows the downflow of the displacement rinse into the resin in the regeneration vessel.

The next step, FIG. 2D is the first of a number of rinse steps. The liquid used for the displacement rinse is generally product liquid from reservoir 40 but can be deionized water from another source if desired. The liquid is pumped by pump 72 through conduit 70 from tank 40 to the top of leg 18 of the regeneration vessel 14 thru valve 76 and a distributor 77 for distribution through the packed resin bed located in pulse section 10 at the top of leg 18. The incoming volume of rinse liquid displaces the regenerant liquid one pulse section, 8 to 7, and at the same time moves the liquid in the vessel 14 down thru leg 18 and up through leg 16 for discharge thru resin strainer 21 into conduit 66 for discharge through valve 62 and conduit 60 into waste tank 58. The liquid in waste tank 58 may have valuable chemicals and the use of the word, waste, is for descriptive purposes only. The volume of displacement rinse liquid pumped into vessel 14 should be sufficient to displace the volume of regenerant liquid in section 8 into pulse section 7.

RINSE RECOVERY

In the next step, FIG. 2E, some of the diluted regenerant solution is saved for use as make up liquid to add to the high concentrated regenerant in reservoir 46 so as to dilute the high concentrated regenerant to the proper strength prior to use. The product liquid or deionized water is pumped from tank 40 by pump 72 thru conduit 70 into the top of leg 18 for distribution thru diffuser 77 into resin section 10. The incoming liquid displaces any diluted regenerant solution contained in sections 10 and 9 of leg 18. The displaced solution is discharged from section 9 thru a resin strainer 87, conduit 84 and valve 86 into conduit 85 for discharge into make up tank 82. Again the rinse recovery volume of solution is equal to that volume of dilute solution required to bring the concentrated regenerant up to the desired operating concentration. After a period of time, the volume of liquid in reservoir 82 is dumped into tank 46 and concentrated regenerant is added to make the proper strength.

POLISH RINSE

In the next step, FIG. 2F, the resin in injection column 24 and pulse section 10 is given a final rinse prior to transfer of resin from the injection column 24 into the loading vessel 12. This rinse is the polish rinse. Product liquid or deionized water is pumped by means of pump 72 from the product tank 46 or deionized water reservoir through conduit 78, valve 80, injection column 24 and pulse section 10 of leg 18. The amount of liquid pumped is limited only by the amount of time available to complete this step. However, several pulse section volumes of liquid should be pumped in order to achieve maximum polishing (rinsing-off of small amounts of regenerant). The liquid is discharged thru resin strainer 77 located at the top of leg 18, conduit 74, valve 88 and conduits 90 and 54 for return to the feed tank 28 where it will be recycled. It should be noted that the flow of the polish rinse is up through the resin in pulse section 10 which is counter to the flow of liquid through pulse section 10 during the displacement rinse and recovery rinse steps.

The polish rinse also produces a phenomenon in the resin flow path that is considered a unique effect in the operation of this system. This unique effect, hereinafter referred to as the "Terrien Effect" is believed to be due to the following. The introduction of the polish rinse liquid into the injection column 24 at a point in close proximity to the resin inlet valve 26 tends to push the resin away from the valve 26 leaving a resin-free volume of liquid in the injection column 24. When the valve 26 is opened and pressure applied to the resin in the pulse section 10 and injection column 24, the volume of resin-free liquid at the entrance to valve 26 will be forced into the loading vessel 12 pushing the compact resin bed 13 in the loading vessel upward, thus making room for the admission of resin into the bottom of the loading vessel. The liquid will pass into the compact resin bed 13 thus loosening the resin into a "packed" resin bed mode and allowing the resin slurry in the injection column 24 to enter the loading vessel. It is generally understood that resin will not move resin and that in the absence of the Terrien Effect this system did not operate satisfactorily.

RESIN TRANSFER TO LOADING VESSEL

Figure 2H:
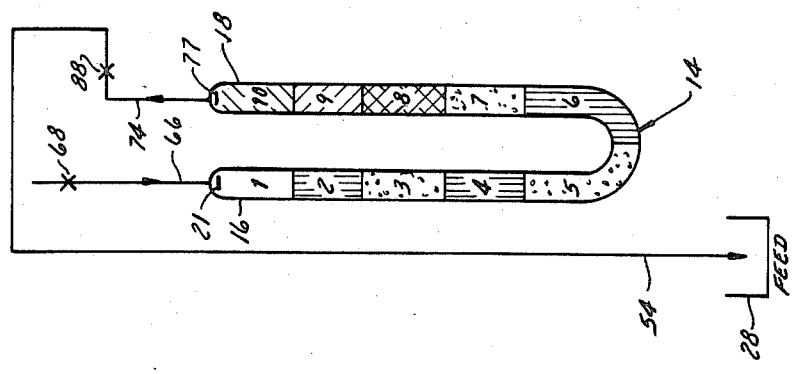
FIG. 2H shows the shift of the resin bed in the regeneration vessel.
Figure 2G:
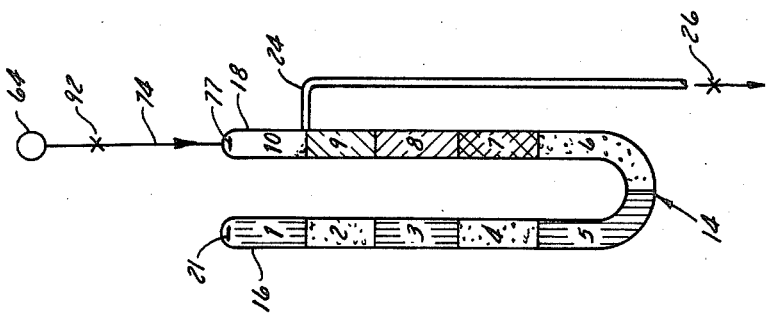
FIG. 2G shows the transfer of the resin from the regeneration vessel to the loading vessel.

In the next step, FIG. 2G, the resin in section 10 after having been rinsed thoroughly is ready to be transferred to the loading vessel 12. This requires the flow of feed liquid to be stopped in the loading vessel, either by stopping the pump 32 or, as in the case of large systems, by bypassing the feed liquid back to feed tank. Valve 36 is left open and valve 42 is closed. Valves 22, 26, and 92 are opened. All of the other valves are closed. Air or water at an elevated pressure sufficient to move the resin in several seconds, approximately 5 pounds per square inch, enters the regeneration vessel 14 through valve 92 and conduit 74 forcing the resin in pulse section 10 to pass from pulse section 10 of leg 18 thru injection column 24 through resin valve 26 up into loading vessel 12. The compact resin bed 13 in the loading vessel is pushed up as a unit toward the top of the loading vessel by the Terrien Effect of the initial flow of a volume of resin-free liquid into the loading vessel. The liquid contained in the resin slurry is free to exit through distributor 33, conduit 34 and through centrifugal pump 32 which is stopped. If the pump 32 is on, the liquid is bypassed through line 41 and valve 43 to line 54. The time for this step is determined by observing or sensing the absence of resin in pulse section 10 and is nominally about 10 seconds.

RESIN SHIFT

In the final step, FIG. 2H, the packed resin bed in the regeneration vessel 14 is shifted to clear the pulse section 1 in leg 16 and to fill pulse section 10 in leg 18. This is accomplished by applying air or waste liquid at a slight pressure of about 5 pounds per square inch. If air is used, valves 68 and 88 are opened and the resin will shift laminarly down in leg 16 and up in leg 18 until the resin reaches the screen 77 at the top of pulse section 10. The resin will stop moving, but the liquid contained in the resin slurry will continue to exit thru the stainer or screen 77 located at the top of pulse section 10 until pulse section 1 is resin-free. This can be determined by observation or by means of a sensor located at the bottom of pulse section 10. Larger designs may require that valve 56 or 62 be opened to vent the pressurized air to atmosphere and prevent too much shifting of the liquid interfaces by blowing out the interstial liquid. The preferred practice is to use air for the driving force to shift the resin around the regeneraton vessel.

OPERATION OF THE APPARATUS

The sequence of stages in one cycle of operation of the apparatus is as follows:

The "onstream" stage as shown in FIG. 1 refers to the passage of the feed liquid through the resin bed in loading vessel 12. Valves 36 and 42 are open and feed pump 32 is turned on. Feed liquid is pumped from reservoir 28 through conduit 30 into the loading vessel 12 through inlet 34. Product liquid is forced out of the loading vessel 12 through outlet 35 into conduit 38 for delivery to product reservoir 40 through riser 39. The "onstream" stage is approximately 30 minutes dependent on feed water concentration and the resin absorption capability as discussed hereinafter. Pulse section 1 in the regeneration vessel 14 at the start of the "onstream" stage as shown in FIG. 2A is resin free.

Figure 3:
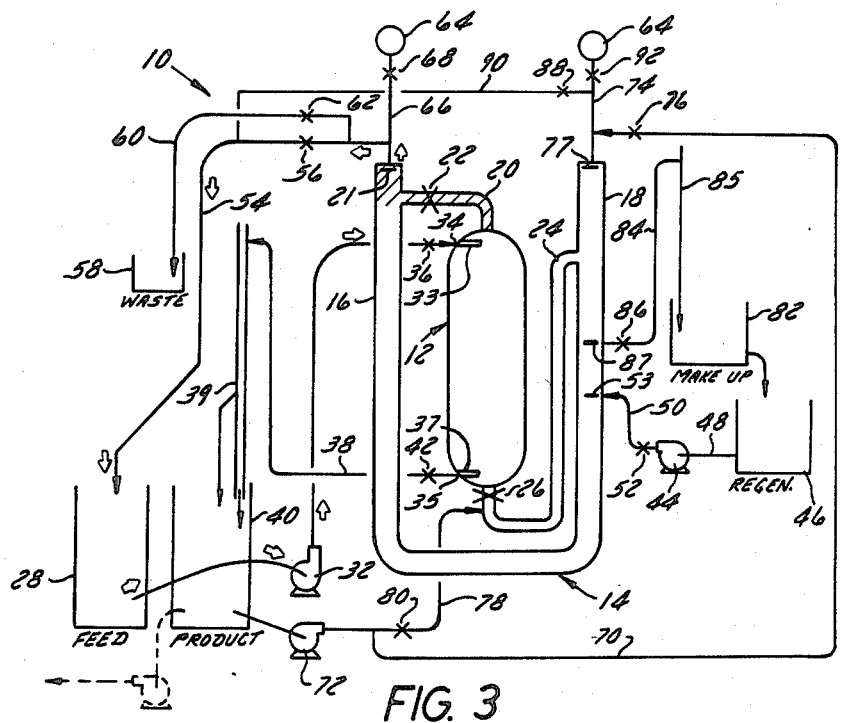
FIG. 3 is a view similar to FIG. 1 showing the resin transfer stage.

The "resin transfer" stage as shown in FIG. 3 refers to the transfer of resin from the loading vessel 12 to pulse section 1, at the top of leg 16 of the regeneration vessel 14. The apparatus is still in the "onstream" condition with valves 36 and 42 open and the pump 32 turned on. Resin at the top of the loading vessel 12 is transferred to the regeneration vessel 14 through conduit 20 by opening valves 22 and 56. Valve 22 can be opened intermittently for short periods of time to "spurt" resin through conduit 20 or the valve can be opened once to move the resin in a single transfer. The transfer of resin is accomplished by the difference in pressure required to pump feed liquid through the resin bed (approximately 10 to 30 PSI) to the outlet 35 and the pressure required to pump feed liquid through conduit 20 (approximately 3 to 6 PSI). The valve 56 is open to allow excess feed liquid to flow back to feed reservoir 28 through conduit 54. A screen 21 is provided at the top of leg 16 to prevent resin from flowing through conduit 54 to reservoir 28. If desired, valve 42 can be closed momentarily to apply full pressure to transfer the resin. The preferred transfer of resin should occur during the first several minutes of the cycle. Pulse section 1 in the regeneration vessel 14 at the end of the "resin transfer" stage as shown in FIG. 2B is now full or almost full of spent resin.

Figure 4:
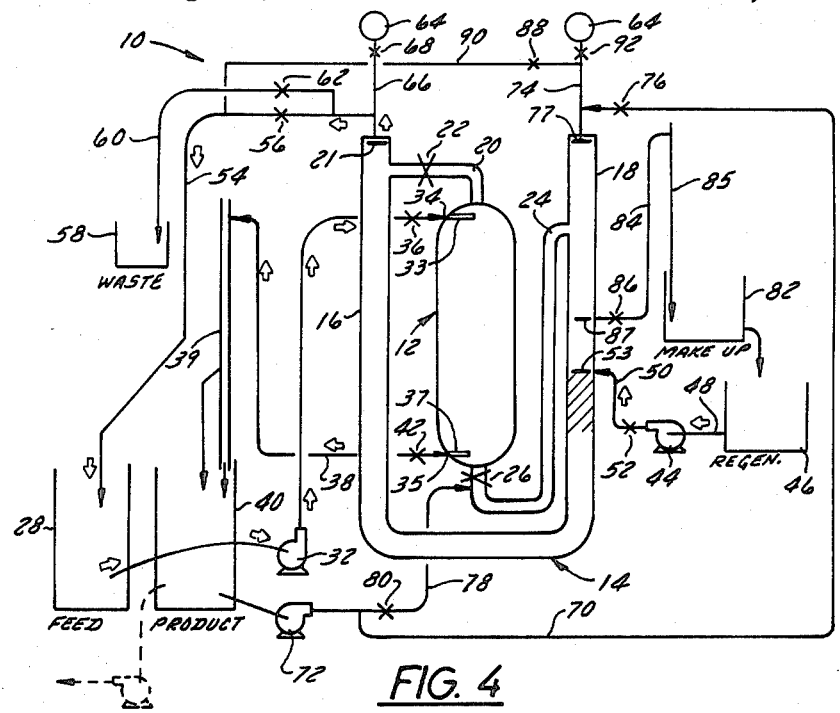
FIG. 4 is a view similar to FIG. 1 showing the regeneration stage.

After the regeneration vessel is filled with relatively loosely packed resin, valve 22 is closed and valves 52 and 56 are opened, as shown in FIG. 4. Pump 44 is turned on and regenerant liquid is pumped slowly into the regeneration vessel 14 at the approximate interface between resin sections 8 and 9, as seen in FIG. 2C. The regenerant liquid is pumped into the vessel 14 for 1 to 15 minutes in a quantity sufficient to fill the void volume in pulse section 8 with regenerant. In some instances, more or less regenerant may be used depending on the type of processing. It should be noted that the regeneration vessel is filled with resin and liquid at the start of the regeneration stage. As the regenerant liquid is pumped into the regeneration vessel, a corresponding amount of liquid at the top of leg 16 will be discharged through conduit 54 to reservoir 28. It should be noted that the liquid in pulse section 1 is feed liquid which was used to transfer the resin from the loading vessel 12 during the previous stage. This feed liquid is returned to the feed reservoir 28 rather than being discharged to waste. The volume of feed liquid in pulse section 1 is never more than the resin void volume of the pulse section. Therefore, when more or less regenerant is used, this must be compensated for during the displacement rinse stage.

Figure 5:
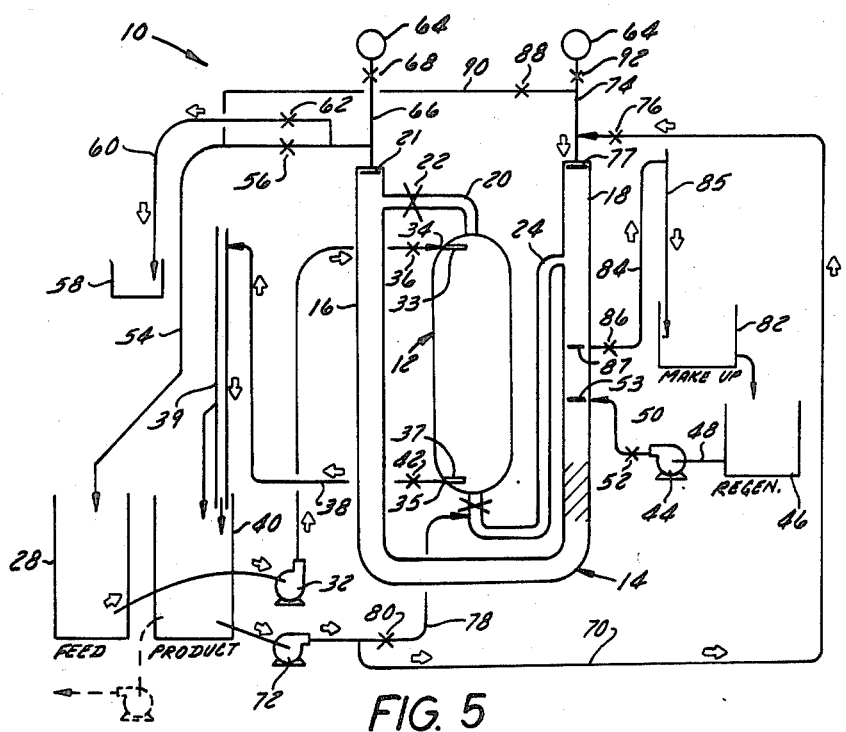
FIG. 5 is a view similar to FIG. 1 showing the displacement rinse stage.

The "displacement rinse" stage, as shown in FIG. 5, refers to the introduction of product liquid into the regeneration vessel to rinse the regenerant fluid off of the resin in sections 10, 9 and 8. The loading vessel 12 is still "onstream" with valves 36 and 42 open and pump 32 turned on. Valves 52 and 56 are closed and pump 44 turned off. Valves 62 and 76 are opened and pump 72 turned on to pump deionized or product liquid from product reservoir 40 through conduit 70 into the top of leg 18. The displacement rinse occurs in a downflow mode pushing the liquid down in the leg 18 of the regeneration vessel 14 and up toward the top of the leg 16 where it is discharged through conduits 54 and 60 to waste reservoir 58. Pulse section 10 in the regeneration vessel, as seen in FIG. 2D, at the end of this stage will be filled with fresh rinse liquid. The liquid in each successive section having been forced into the next section and the liquid in the pulse section 1 discharged to the waste reservoir 58.

The "recovery rinse" stage refers to the recovery of a small amount of dilute regenerant from pulse section 9 after the displacement rinse to be used as make up liquid for the regenerant. This is accomplished by closing valve 62 and opening valve 86 with pump 72 turned on. The recovery rinse liquid will displace the dilute regenerant downward pulse from section 10 and 9 for discharge through valve 86 and conduits 84, 85 into make up reservoir 82.

Figure 6:
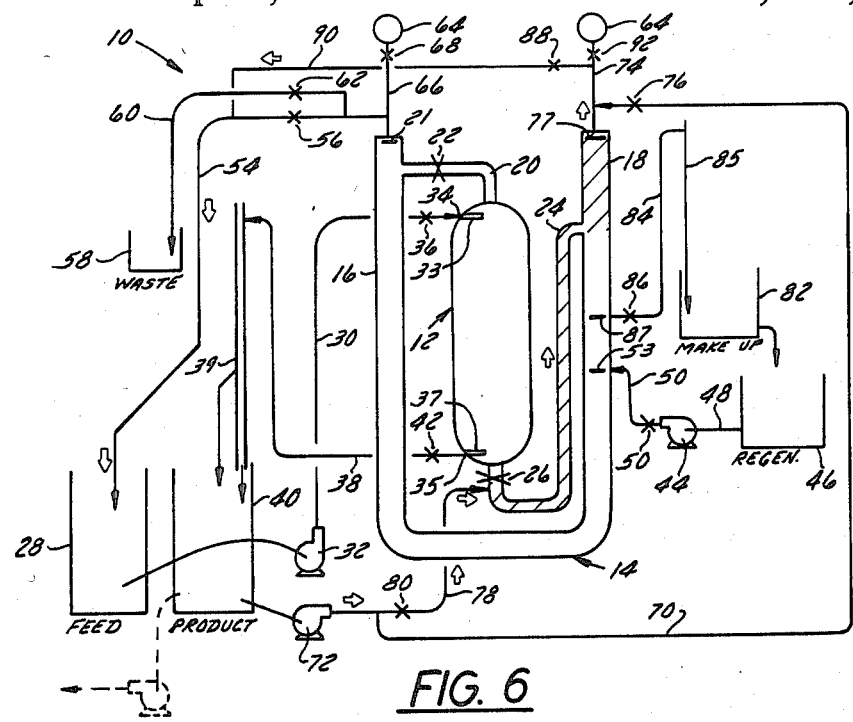
FIG. 6 is a view similar to FIG. 1 showing the polish rinse stage.

The "polish rinse" stage as seen in FIG. 6 refers to the up flow of rinse liquid through injection column 24 and resin section 10 at the top of leg 18. The loading vessel 12 is still in the "onstream" stage with valves 36 and 42 open and the pump 32 turned on. Valves 62 and 76 are closed. Valves 80 and 88 are opened and the pump 72 turned on to pump product liquid from reservoir 40 through injection column 24 into the regeneration vessel 14 at the interface of pulse sections 9 and 10 as seen in FIG. 2F. This liquid is discharged through valve 88 and conduit 90 back to the feed reservoir. The counter flow of rinse liquid through injection column 24 and pulse section 10 compacts the resin in the injection column creating a volume of resin-free liquid at valve 26 referred to above as the Terrien Effect. This is the final rinse step and is continued until several pulse section volumes have been pumped through the resin in pulse section 10.

Figure 7:
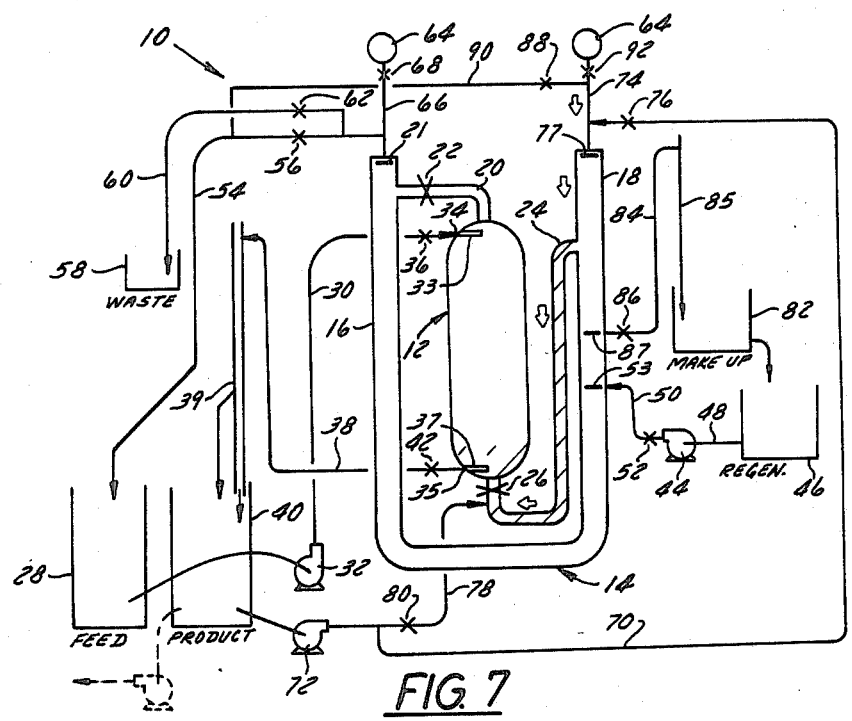
FIG. 7 is a view showing the regenerated resin transfer stage.

The "resin transfer" stage, as seen in FIG. 7 refers to the transfer of resin from pulse section 10 in regeneration vessel 14 to the loading vessel 12. Up to this time in the cycle, the loading vessel 12 has been "onstream" with valves 36 and 42 open and the pump 32 turned on. Valve 42 is now closed and the pump 32 turned off. Valves 26 and 36 are opened and the resin in section 10 at the top of leg 18 of regeneration vessel 14 is transferred through injection column 24 into the bottom of the loading vessel 12. Ths is accomplished by opening valve 92 to admit air or liquid under pressure into the upper end of leg 18. The air will act on the resin-liquid slurry in pulse section 10 to force the resin and liquid from section 10 into injection column 24. The resin in column 24 is forced into load vessel 12. The water, produced by the Terrien Effect, in injection column 24 on the inlet side of valve 26 enters the loading vessel 12, and pushes the compact resin bed in the loading vessel upward producing a resin-free volume of liquid at the bottom of vessel 12. The excess liquid will be returned to the feed reservoir 28 through conduit 30. The blow-down time should be approximately 10 seconds. As soon as the resin is transferred, valve 26 and valve 88 open to vent high pressure air and then close. Valve 42 is reopened and concurrently valve 92 is closed. The pump 32 is turned on and the loading vessel 12 is back "onstream."

The final stage in the cycle is the "resin shift" stage wherein all of the packed resin bed in the regeneration vessel 14 is shifted to clear pulse section 1 at the top of leg 16 and to fill pulse section 10 at the top of leg 18. During this stage, the loading vessel 12 is "onstream" with valves 36 and 46 open and the pump 32 turned on. The resin in the regeneration vessel 14 is shifted, as described in oonnection with FIG. 2G, to refill section 10 and empty section 1 by opening valves 68 and 88 to apply pressurized air to the top of the resin in leg 16 and to allow any liquid contained in pulse section 10 to vent to the feed reservoir 28. The air pressure is applied with sufficient force to shift the entire liquid-resin bed in the regeneration vessel 14. The amount of pressure required to shift the resin bed is minimal because of the U-shaped configuration of the regeneration vessel.

The ion exchange apparatus described herein provides a regenerated resin having an absorption capacity approaching 100%. Regeneration of the resin has been achieved using a regenerant at stoichometric ratios (one to one). The following test was run to substantiate these results:

The loading vessel used had a diameter of six inches and a resin the height of twenty-eight inches. The vessel was filled with a strong cation resin. The resin bed having a volume of 0.46 cubic feet. Sensors were located six inches and sixteen inches from the top and at the discharge outlet at the bottom of the vessel. Waste water having a hardness of 30 grains per gallon was run through the resin bed until the sensor at the discharge outlet registered 30 grains indicating the resin bed was completely loaded.

The resin bed was then pulsed through the regeneration vessel. Regenerate sodium chloride at a strength of 70% salinometer and a normal capacity of 31.5 kilograins per cubic feet, was admitted to the regenerating vessel at a ratio of one to one or stoichometric ratio.

The regeneration process was continued until the loading vessel was filled with regenerated resin.

Waste water was then fed to the loading vessel and spot checks were made at the six inch, sixteen inch and discharge sensor after each twenty gallons. The following is a chart of the test results.

| | Accumulative | | | Spot Grains | | | Spot Equivalent | | |
|---|---|---|---|---|---|---|---|---|---|
| | Gallons | Grains | Equiv. | 1 | 2 | Disch. | 1 | 2 | Disch. |
| .1 | 20 | 600. | .774 | 0 | 0 | 0 | 0 | 0 | 0 |
| 2 | 40 | 1,200 | 1.548 | 0 | 0 | 0 | 0 | 0 | 0 |
| 3 | 60 | | | 0 | 0 | 0 | 0 | 0 | 0 |
| 4 | 80 | | | 3 | 0 | 0 | .077 | 0 | 0 |
| 5 | 100 | 3,000 | 3.870 | 6 | 0 | 0 | .154 | 0 | 0 |
| 6 | 120 | | | 10 | 0 | 0 | .258 | 0 | 0 |
| 7 | 140 | | | 14 | 1 | 0 | .361 | .025 | 0 |
| 8 | 160 | | | 20 | 1 | 0 | .516 | .025 | 0 |
| 9 | 180 | | | 22 | 2 | 0 | .567 | .050 | 0 |
| 10 | 200 | 6,000 | 7.740 | 25 | 3 | 0 | .645 | .077 | 0 |
| 11 | 220 | | | 27 | 3 | 0 | .697 | .077 | 0 |
| 12 | 240 | | | 29 | 5 | 0 | .748 | .129 | 0 |
| 13 | 260 | | | 30 | 11 | 0 | .774 | .284 | 0 |
| 14 | 280 | | | 30 | 19 | 1 | .774 | .490 | .025 |
| 15 | 300 | 9,000 | 11.610 | 30 | 27 | 2 | .774 | .697 | .050 |
| 16 | 320 | | | 30 | 29 | 2 | .774 | .748 | .050 |
| 17 | 340 | | | 30 | 29 | 2 | .774 | .748 | .050 |
| 18 | 360 | | | 30 | 30 | 1 | .774 | .774 | .025 |
| 19 | 380 | | | 30 | 30 | 0 | .774 | .774 | 0 |
| 20 | 400 | 12,000 | 15,480 | 30 | 30 | 1 | .774 | .774 | .025 |
| 21 | 420 | | | 30 | 30 | 3 | .774 | .774 | .077 |
| 22 | 440 | | | 30 | 30 | 6 | .774 | .774 | .154 |
| 23 | 460 | | | 30 | 30 | 10 | .774 | .774 | .258 |
| 24 | 480 | | | 30 | 30 | 17 | .774 | .774 | .430 |
| 25 | 500 | 15,000 | 19,350 | 30 | 30 | 25 | .774 | .774 | .645 |
| 26 | 520 | | | 30 | 30 | 28 | .774 | .774 | .722 |
| 27 | 540 | 16,200 | 20,890 | 30 | 30 | 30 | .774 | .774 | .774 |
| | | | | | | | | | 3.285 |

As seen in the chart, the discharge sensor indicated 30 grains after 540 gallons of waste water had been fed to the regenerated resin bed. The resin bed was then charged with 16,200 grains (540 gallons × 30 grains/gallon). For calcium the grain equivalent is 20.89 (0.00129 hardness factor for calcium × 16,200 grains). The normal resin capacity is 31.5 kilograms/ft.$^3$ or 1.44 equivalence/liter. With a bed volume of 0.46 ft.$^3$ the bed capacity was 14.5 kilograins (0.46 × 31.5). The equivalent bed capacity is 18.7 (0.46 × 28.3 kilograms/ft.$^2$ × 1.44). From the chart it should be noted that the equivalent leakage after 540 gallons was 3.285. Deducting the leakage 3.285 from the calcium equivalent 20.89 leaves a grain equivalent of 17.61 sorbed calcium. Since the equivalent bed capacity was 18.7, the bed capacity after regeneration was 94.2% (17.61/18.7).

The regeneration capability of this apparatus, 94.2%, is a distinct improvement over present systems where the regeneration capability is approximately 50%. It should also be noted that the regeneration was accomplished on a one to one ratio between regeneration and resin. This is in contrast to a five to one ratio for fixed bed regeneration.

The embodiments of the invention in which an exclusive property or privilege is claimed, are defined as follows:

1. A low pressure moving bed ion exchange apparatus comprising
   a loading vessel having a feed conduit and a discharge conduit, pump means for passing a feed liquid through said feed conduit for passage through an ion exchange resin bed therewithin to said discharge conduit, said loading vessel having a resin inlet and a resin outlet, a regeneration vessel having an ion exchange resin bed therewithin and being in resin passing communication with said resin inlet of the loading vessel through a first resin transfer means connected to one end of said regeneration vessel and in resin passing communication with said resin outlet of the loading vessel through a second resin transfer means connected to the other end of said regeneration vessel, a first resin valve in said first resin transfer means to control the flow of resin from said one end of said regeneration vessel to said resin inlet in said loading vessel, a second resin valve in said second transfer means to control the flow of resin from said resin outlet in said loading vessel to the other end of said one end of said regeneration vessel, first means for passing a regenerant solution into said regeneration vessel, second means for passing a displacement rinse liquid into said resin bed in said regeneration vessel to displace said regenerant solution, first pressure means connected to said one end of said regeneration vessel for transferring a predetermined volume of said resin bed in said one end of said regeneration vessel through said first transfer means into said loading vessel, and second pressure means connected to said other end of said regeneration vessel for shifting the resin bed in said regeneration vessel from said other end of said regeneration vessel to replace the volume of resin transferred from said one end of said regeneration vessel on transfer to said loading vessel.

2. The apparatus according to claim 1, including third means connected to said first resin transfer means for passing a polish rinse liquid solution through said first transfer means in said one end of said regeneration vessel.

3. The apparatus according to claim 2 wherein said regeneration vessel is U-shaped.

4. The apparatus according to claim 3 wherein said regeneration vessel is divided into pulse sections of equal volume and said first transfer means is connected to said regeneration vessel at approximately the interface between the first and second pulse sections in said one end of the regeneration vessel.

5. The apparatus according to claim 3 or 4 wherein said regeneration vessel has substantially the same cross-sectional area throughout the full length of the vessel.

6. The apparatus according to claim 2 wherein said third means is connected to said first transfer means in close proximity to said first resin valve whereby resin in said first transfer means is pushed away from said first resin valve to provide a resin-free volume of liquid at the inlet to said first resin valve.

7. A moving bed ion exchange apparatus comprising
a loading vessel having a resin inlet at the bottom and a resin outlet at the top,
a feed conduit connected to said loading vessel near the top,
a discharge conduit connected to said loading vessel near the bottom,
a compact ion exchange resin bed in said loading vessel,
a liquid collecting means within said loading vessel connected to said discharge conduit,
pump means for feeding a solution to be ion exchanged through said feed conduit for passage through said ion exchange resin bed within said loading vessel to said collecting means,
a regeneration vessel having a portion of one end in resin passing communication with said resin inlet in said loading vessel through a first transfer conduit, and the other end in resin passing communication with said resin outlet in said loading vessel through a second transfer conduit,
a movable packed resin bed within said regeneration vessel,
regenerant pumping means for passing a regenerant solution into said regeneration vessel,
a fluid pumping means for passing a rinse solution into said portion of said one end of said regeneration vessel for passage through said resin bed in said regeneration vessel and a fluid conduit connected to the other end of said regeneration vessel for discharging said regenerant from said regeneration vessel.

8. The apparatus according to claim 7 wherein said regeneration vessel is in the form of a "U" and is divided into a number of pulse sections of equal volume,
said first transfer conduit being connected to said one end of said regeneration vessel at the interface between the first and second pulse sections,
and means for applying pressure to said one end of said regeneration vessel for transferring one of said pulse sections into said loading vessel.

9. A moving bed ion exchange apparatus comprising
a loading vessel having a resin inlet and a resin outlet,
a first resin passing control valve at the resin inlet and a second resin passing control valve at the resin outlet,
means for passing a feed liquid through an ion exchange resin bed in said loading vessel,
a U-shaped regeneration vessel having a resin bed therein,
said regeneration vessel having
a first leg connected to said resin inlet through a first resin transfer conduit and a second leg connected to said resin outlet through a second resin transfer conduit,
first means connected to the end of said first leg for selectively admitting fluid under pressure into or venting fluid out of said regeneration vessel,
second means connected to said second leg for selectively admitting fluid into or venting fluid out of said regeneration vessel,
means for admitting a regenerant into said regeneration vessel, and
means for passing a rinse solution through said first resin transfer conduit to create a resin-free volume of rinse solution at the inlet to the loading vessel.

10. The ion exchange apparatus according to claim 9 wherein said rinse passing means is connected to said resin transfer conduit at the junction with the first resin control valve.

11. The ion exchange apparatus according to claim 9 or 10 wherein said regeneration vessel includes
a number of resin pulse sections of equal volume, each pulse section containing approximately 45% resin and 55% liquid.

12. A low pressure moving bed ion exchange apparatus comprising a loading vessel having an ion exchange resin bed therein, means for passing a feed liquid through said ion exchange resin bed, a regeneration vessel having an ion exchange resin bed therein, conduit means for passing exhausted resin from the top of said loading vessel into one end of said regeneration vessel, pump means for introducing a predetermined amount of regenerant into said regeneration vessel, pump means for introducing a rinse liquid into said regeneration vessel to displace said regenerant in a direction counter to the flow of said resin, conduit means for passing regenerated resin from the other end of said regeneration vessel into the bottom of said loading vessel, and pump means for introducing rinse liquid into said regenerated resin passing conduit means at the entrance to said loading vessel counter to the flow of resin to provide a resin-free liquid at the entrance to the loading vessel.

13. The apparatus according to claim 12 wherein said regeneration vessel is "U" shaped and is divided into a predetermined number of resin pulse sections, said exhausted resin passing conduit means being connected to a pulse section at said one end of the regeneration vessel, and said regenerated resin passing conduit means being connected to said other end of said regeneration vessel at the interface between a first pulse section at the said other end of the regeneration vessel and a second pulse section next to the first pulse section.

14. The apparatus according to claim 13 wherein said regenerant introducing means is connected to said other end of said regeneration vessel at the interface between the second pulse section and a third pulse section next to the second pulse section.

15. The apparatus according to claim 12, 13 or 14 including means connected to said regeneration vessel for diverting a portion of said rinse liquid from said regeneration vessel to dilute said regenerant.

* * * * *